(12) United States Patent  
Sasaki et al.

(10) Patent No.: US 8,441,755 B2
(45) Date of Patent: May 14, 2013

(54) MAGNETIC HEAD FOR PERPENDICULAR MAGNETIC RECORDING HAVING A MAIN POLE, A SHIELD AND A COIL CORE PART SETBACK AWAY FROM THE MEDIUM FACING SURFACE A SPECIFIED DISTANCE

(75) Inventors: Yoshitaka Sasaki, Santa Clara, CA (US); Hiroyuki Ito, Milpitas, CA (US); Kazuki Sato, Milpitas, CA (US); Atsushi Iijima, Hong Kong (CN)

(73) Assignees: Headway Technologies, Inc., Milpitas, CA (US); Sae Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/208,980

(22) Filed: Aug. 12, 2011

(65) Prior Publication Data

US 2013/0038966 A1 Feb. 14, 2013

(51) Int. Cl.
*G11B 5/17* (2006.01)
(52) U.S. Cl.
USPC ............ 360/123.03; 360/123.06; 360/123.43; 360/125.29

(58) Field of Classification Search ...... 360/123.01–128
See application file for complete search history.

(56) References Cited

U.S. PATENT DOCUMENTS

| 6,513,228 | B1 * | 2/2003 | Khizroev et al. | 29/603.14 |
| 6,538,843 | B1 * | 3/2003 | Kuroe et al. | 360/110 |
| 6,954,340 | B2 | 10/2005 | Shukh et al. | |
| 2005/0128637 | A1 | 6/2005 | Johnston et al. | |
| 2009/0015965 | A1 | 1/2009 | Sunwoo | |

* cited by examiner

*Primary Examiner* — Allen Heinz
(74) *Attorney, Agent, or Firm* — Oliff & Berridge, PLC

(57) ABSTRACT

A magnetic head includes: a main pole; a coil; a first shield having an end face that is located in a medium facing surface at a position forward of an end face of the main pole along a direction of travel of a recording medium; and a first return path section disposed forward of the main pole along the direction of travel of the recording medium. The first return path section connects part of the main pole away from the medium facing surface to the first shield so that a first space is defined. The coil includes a first portion having a planar spiral shape and wound around a core part of the first return path section. The first portion includes first and second coil elements that each extend through the first space. No part of the coil other than the first and second coil elements exists in the first space.

7 Claims, 7 Drawing Sheets

MAGNETIC HEAD FOR PERPENDICULAR MAGNETIC RECORDING HAVING A MAIN POLE, A SHIELD AND A COIL CORE PART SETBACK AWAY FROM THE MEDIUM FACING SURFACE A SPECIFIED DISTANCE

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield, and a method of manufacturing the same.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head unit of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

Providing one or more shields near the main pole is effective for preventing the aforementioned skew-induced adjacent track erase and increasing the recording density. For example, U.S. Patent Application Publication No. 2009/0015965 A1 discloses a magnetic head including a return yoke that forms a magnetic path in conjunction with the main pole. The return yoke includes a return yoke tip having an end face that is located in the medium facing surface and spaced from an end face of the main pole by a predetermined distance. The return yoke tip functions as a shield.

U.S. Pat. No. 6,954,340 B2 and U.S. Patent Application Publication No. 2005/0128637 A1 disclose a magnetic head including four shields: one having an end face located in the medium facing surface at a position forward of the end face of the main pole along the direction of travel of the recording medium; another having an end face located in the medium facing surface at a position backward of the end face of the main pole along the direction of travel of the recording medium; and the other two having two end faces located in the medium facing surface at positions on opposite sides of the end face of the main pole in the track width direction. The end faces of the four shields are arranged to wrap around the end face of the main pole in the medium facing surface.

In a magnetic head, a position that is located forward of the main pole along the direction of travel of the recording medium is a position on the air-outflow-end side (the trailing end side), while a position that is located backward of the main pole along the direction of travel of the recording medium is a position on the air-inflow-end side (the leading end side). Hereinafter, a shield having an end face located forward of the end face of the main pole along the direction of travel of the recording medium will be referred to as a trailing shield, while a shield having an end face located backward of the end face of the main pole along the direction of travel of the recording medium will be referred to as a leading shield.

In a magnetic head having one or more shields, there are typically provided one or more return path sections for connecting the one or more shields to a portion of the main pole away from the medium facing surface. The one or more shields and the one or more return path sections function to capture a magnetic flux that is produced from the end face of the main pole and spreads in directions other than the direction perpendicular to the plane of the recording medium, and to thereby prevent the magnetic flux from reaching the recording medium. The one or more shields and the one or more return path sections also function to allow a magnetic flux that has been produced from the end face of the main pole and has magnetized the recording medium to flow back to the main pole. Thus, the magnetic head having one or more shields can prevent the adjacent track erase and achieve a further improvement in recording density.

The position of an end of a record bit to be recorded on the recording medium depends on the position of an end of the end face of the main pole located in the medium facing surface, the end being located forward along the direction of travel of the recording medium. In order to define the position of the end of the record bit accurately, it is therefore required that the magnetic head have a trailing shield and that the trailing shield be capable of capturing as much magnetic flux as possible.

In addition, as the frequency of the recording signal is increased for higher recording density, the magnetic head needs improvement in the rate of change of the direction of the magnetic flux produced from the end face of the main pole. To meet such a requirement, it is particularly effective to reduce the length of a magnetic path that passes through the trailing shield and the main pole.

In the magnetic head disclosed in U.S. Patent Application Publication No. 2009/0015965 A1, the return yoke tip corresponds to the trailing shield. This U.S. patent document discloses a technology for reducing the yoke length which is related to the length of the magnetic path passing through the trailing shield and the main pole. More specifically, the technology provides a coil encompassing the main pole in a solenoid structure. The coil includes a lower wire portion passing through the lower portion of the main pole, an upper wire portion passing through the upper portion of the main pole, and a connection portion electrically connecting the lower wire portion and the upper wire portion. The upper wire portion includes an upper wire layer having a stack of at least two layers.

The aforementioned technology, however, has the problem that the structure of the coil and the structure in the vicinity of the coil become complicated and a greater number of steps are needed to form the coil.

In addition, in the magnetic head disclosed in U.S. Patent Application Publication No. 2009/0015965 A1, there is a large distance between the upper wire layer and the return yoke in a direction perpendicular to the medium facing surface. That is, the magnetic path through the trailing shield and the main pole is not sufficiently reduced in length.

OBJECT AND SUMMARY OF THE INVENTION

It is an object of the present invention to provide a magnetic head for perpendicular magnetic recording that is capable of reducing the length of a magnetic path that passes through a main pole and a shield, the shield having an end face located in the medium facing surface at a position forward of an end face of the main pole along the direction of travel of a recording medium, and to provide a method of manufacturing such a magnetic head.

A magnetic head for perpendicular magnetic recording of the present invention includes: a medium facing surface that faces a recording medium; a coil that produces a magnetic field corresponding to data to be written on the recording medium; a main pole that has an end face located in the medium facing surface, the main pole allowing a magnetic flux corresponding to the magnetic field produced by the coil to pass, and producing a write magnetic field for writing the data on the recording medium by means of a perpendicular magnetic recording system; a first shield made of a magnetic material and having an end face that is located in the medium facing surface at a position forward of the end face of the main pole along the direction of travel of the recording medium; a gap part made of a nonmagnetic material and including a first portion interposed between the main pole and the first shield; and a first return path section made of a magnetic material and disposed forward of the main pole along the direction of travel of the recording medium.

The first return path section connects part of the main pole away from the medium facing surface to the first shield so that a first space is defined by the main pole, the gap part, the first shield, and the first return path section. The first return path section includes a core part. The coil includes a first portion having a planar spiral shape and wound around the core part. The first portion includes a first coil element and a second coil element that each extend through the first space. The first coil element is located between the second coil element and the medium facing surface. No part of the coil other than the first and second coil elements exists in the first space. The minimum distance between the core part and the medium facing surface falls within the range of 1.4 to 4.0 µm.

In the magnetic head for perpendicular magnetic recording of the present invention, the minimum distance between the second coil element and the core part may fall within the range of 50 to 200 nm.

In the magnetic head for perpendicular magnetic recording of the present invention, the first space may have an inner wall, and the first coil element may have an end face facing toward the medium facing surface. The minimum distance between the end face of the first coil element and the inner wall may fall within the range of 50 to 200 nm.

The magnetic head for perpendicular magnetic recording of the present invention may further include a second shield and a second return path section. The second shield is made of a magnetic material and has an end face that is located in the medium facing surface at a position backward of the end face of the main pole along the direction of travel of the recording medium. The second return path section is made of a magnetic material and disposed backward of the main pole along the direction of travel of the recording medium. In this case, the gap part may further include a second portion interposed between the main pole and the second shield. The second return path section connects part of the main pole away from the medium facing surface to the second shield so that a second space is defined by the main pole, the gap part, the second shield, and the second return path section. The coil may include a second portion having a planar spiral shape and wound around a portion of the second return path section.

The magnetic head for perpendicular magnetic recording of the present invention may further include two side shields that are each made of a magnetic material and that have two end faces located in the medium facing surface at positions on opposite sides of the end face of the main pole in the track width direction.

A method of manufacturing the magnetic head for perpendicular magnetic recording of the present invention includes the steps of forming the main pole; forming the gap part; forming the first shield; forming the first return path section; and forming the coil.

The step of forming the first return path section includes the step of forming an accommodation part for accommodating the first and second coil elements, by using a portion of the first return path section including the core part. The accommodation part has an inner wall. The method of manufacturing the magnetic head further includes the step of forming an insulating film to cover the inner wall of the accommodation part. The step of forming the coil includes the steps of forming a conductive layer that is to become the first portion later, such that the conductive layer is in contact with the inner wall of the accommodation part via the insulating film and protrudes from the accommodation part; and polishing the conductive layer so that a portion of the conductive layer protruding from the accommodation part is removed and the conductive layer thereby becomes the first portion.

In the method of manufacturing the magnetic head for perpendicular magnetic recording of the present invention, the insulating film may have a thickness within the range of 50 to 200 nm.

In the magnetic head for perpendicular magnetic recording and the method of manufacturing the same of the present invention, the first portion of the coil includes the first coil element and the second coil element each extending through the first space. No part of the coil other than the first and second coil elements exists in the first space. The minimum distance between the core part and the medium facing surface falls within the range of 1.4 to 4.0 µm. According to the present invention, it is therefore possible to reduce the length of the magnetic path passing through the first shield and the main pole, i.e., the length of the magnetic path passing through the first shield, the first return path section, and the main pole, wherein the first shield has an end face located in the medium facing surface at a position forward of the end face of the main pole along the direction of travel of the recording medium. The present invention also makes it possible to secure a sufficient magnetomotive force of the coil. Consequently, according to the present invention, it is possible to improve the rate of change of the direction of the magnetic flux produced from the end face of the main pole.

Other objects, features and advantages of the present invention will become fully apparent from the following description.

DETAILED DESCRIPTION OF THE PREFERRED EMBODIMENT

Figure 1:
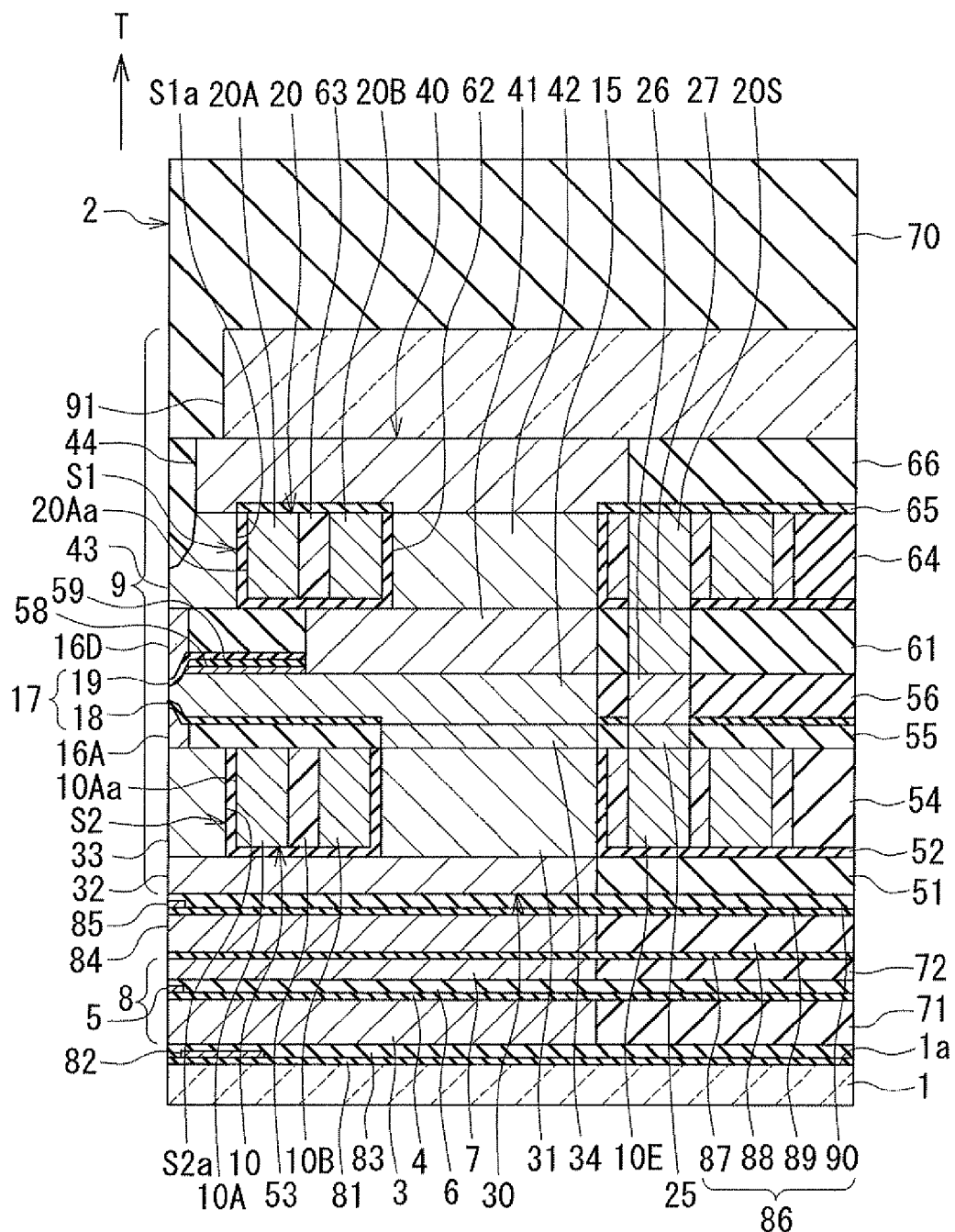
FIG. 1 is a cross-sectional view showing the configuration of a magnetic head according to an embodiment of the invention.

An embodiment of the present invention will now be described in detail with reference to the drawings. First, reference is made to FIG. 1 to FIG. 5 to describe the configuration of a magnetic head according to the embodiment of the invention. The magnetic head according to the embodiment is for use in perpendicular magnetic recording. FIG. 1 is a cross-sectional view showing the configuration of the magnetic head according to the embodiment. FIG. 1 shows a cross section perpendicular to the medium facing surface and the top surface of the substrate. The arrow with the symbol T in FIG. 1 indicates the direction of travel of a recording medium.

Figure 2:
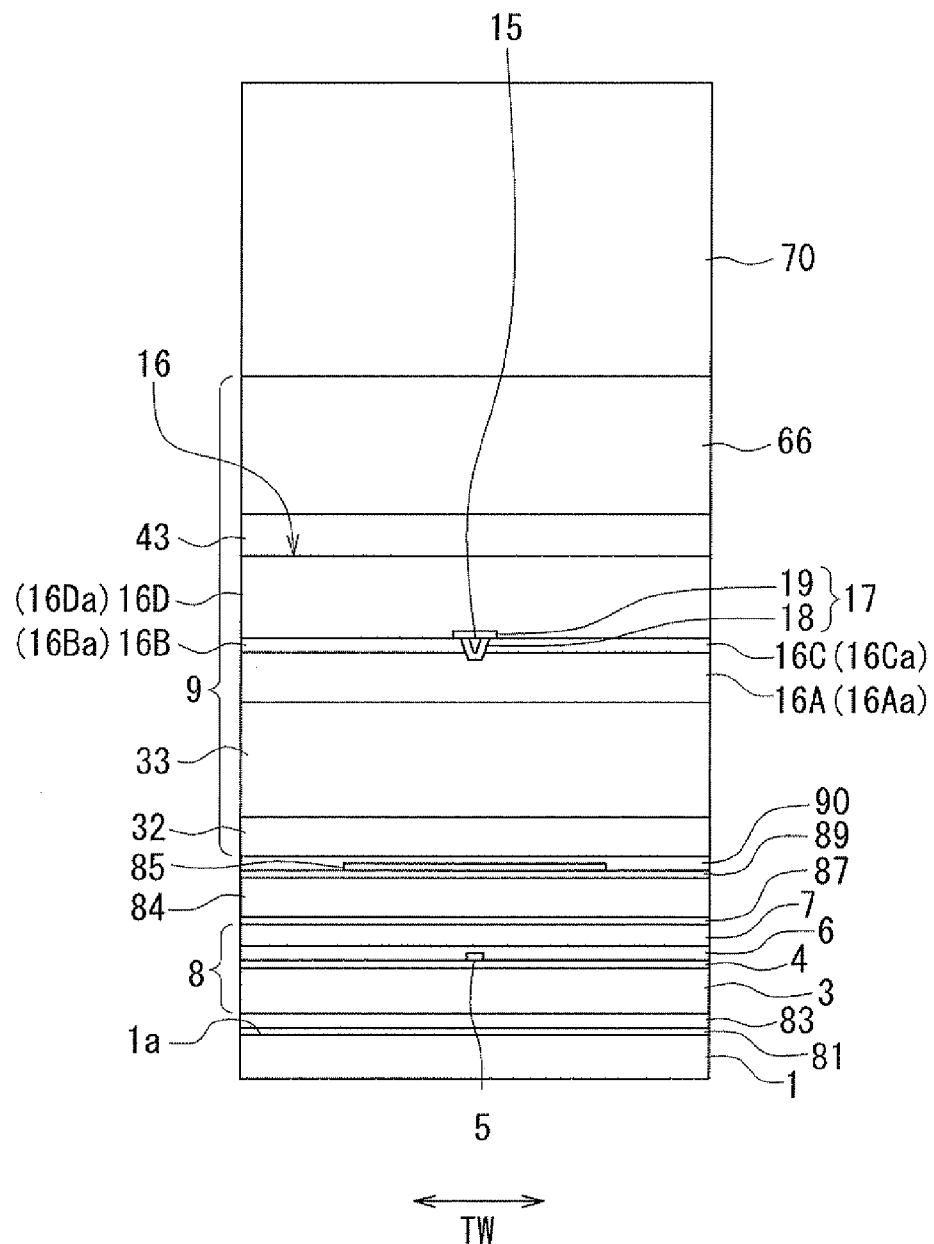
FIG. 2 is a front view showing the medium facing surface of the magnetic head according to the embodiment of the invention.
Figure 3:
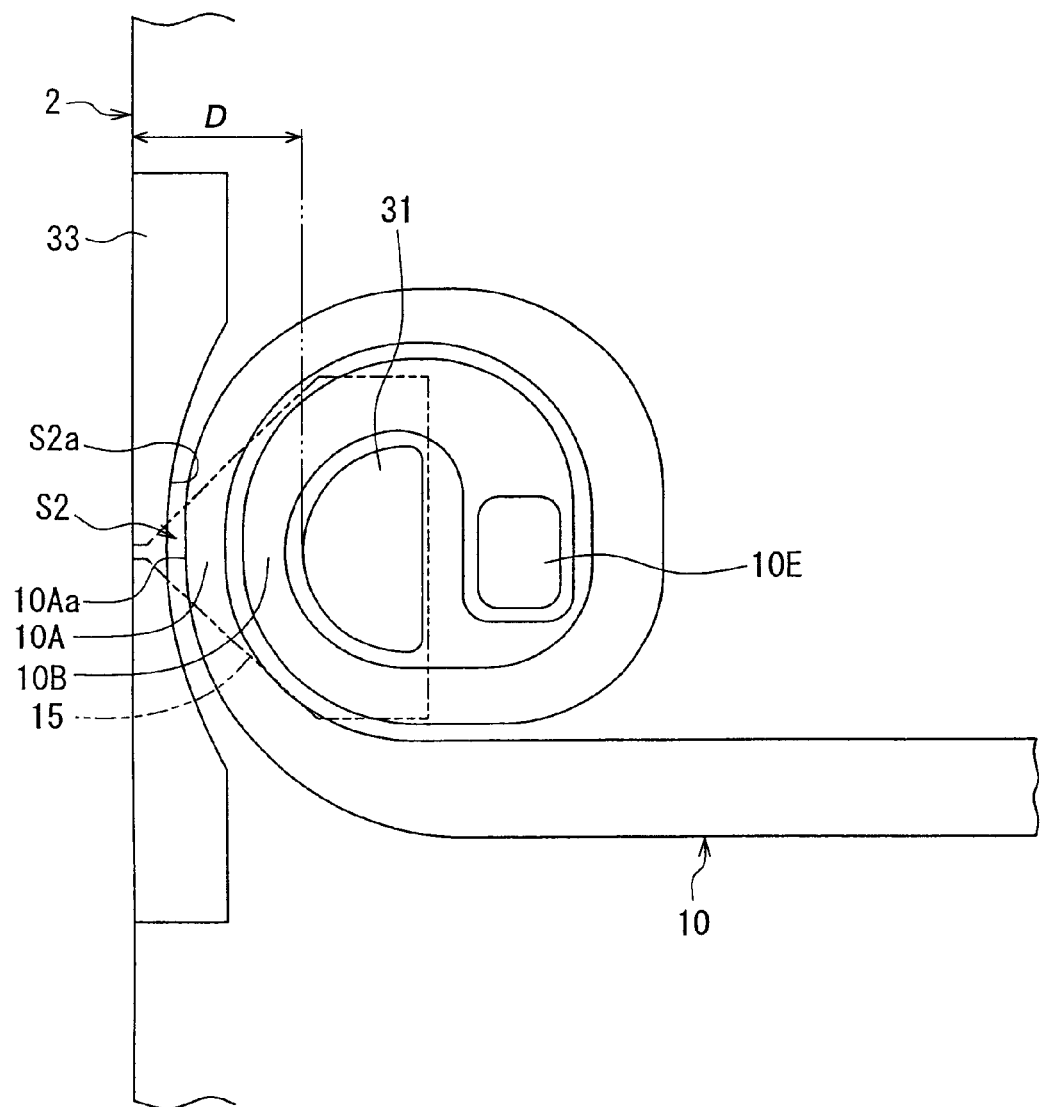
FIG. 3 is a plan view showing a second portion of a coil in the magnetic head according to the embodiment of the invention.
Figure 4:
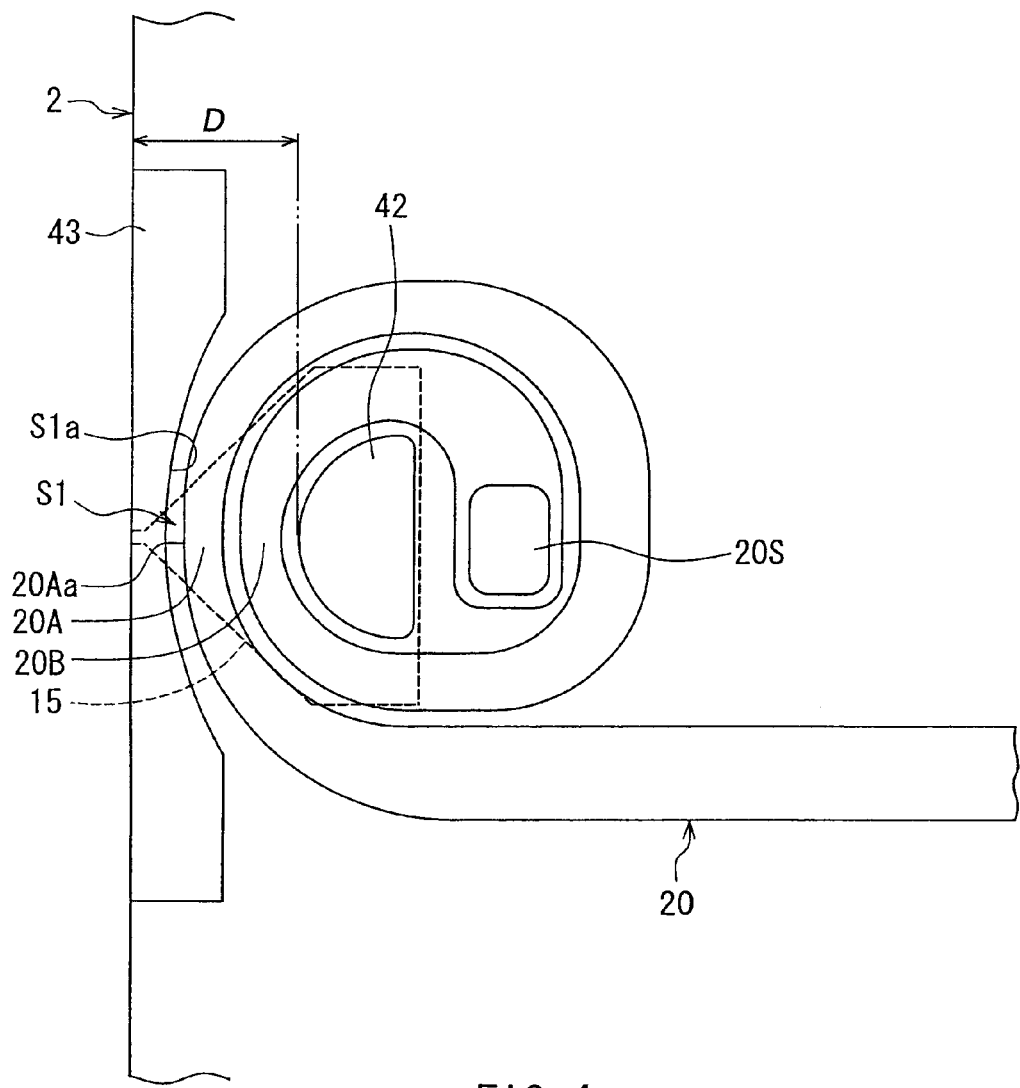
FIG. 4 is a plan view showing a first portion of the coil in the magnetic head according to the embodiment of the invention.
Figure 5:
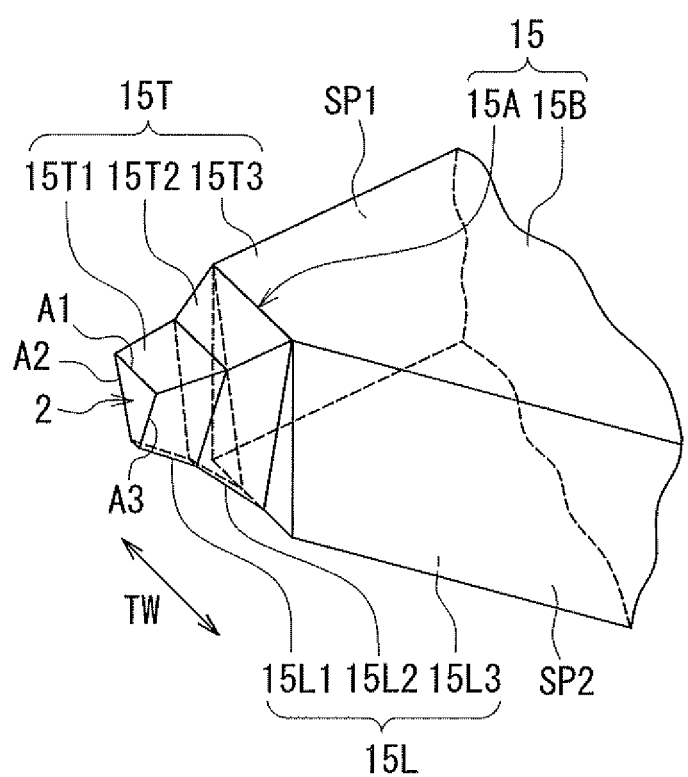
FIG. 5 is a perspective view showing a part of a main pole near the medium facing surface in the magnetic head according to the embodiment of the invention.

FIG. 2 is a front view showing the medium facing surface of the magnetic head according to the embodiment. FIG. 3 is a plan view showing a second portion of the coil in the magnetic head according to the embodiment. FIG. 4 is a plan view showing a first portion of the coil in the magnetic head according to the embodiment. FIG. 5 is a perspective view showing a part of a main pole near the medium facing surface in the magnetic head according to the embodiment. The arrows with the symbol TW in FIG. 2 to FIG. 5 indicate the track width direction.

As shown in FIG. 1, the magnetic head according to the embodiment has a medium facing surface 2 that faces the recording medium. As shown in FIG. 1 and FIG. 2, the magnetic head includes: a substrate 1 made of a ceramic material such as aluminum oxide-titanium carbide ($Al_2O_3$—TiC) and having a top surface 1a; an insulating layer 81 made of an insulating material and disposed on the top surface 1a of the substrate 1; a heater 82 disposed on the insulating layer 81; and an insulating layer 83 made of an insulating material and disposed to cover the insulating layer 81 and the heater 82. The insulating layers 81 and 83 are made of alumina ($Al_2O_3$), for example. The heater 82 generates heat for causing part of the medium facing surface 2 to protrude.

The magnetic head further includes a read head unit 8 disposed forward along the direction T of travel of the recording medium (i.e., disposed on the trailing end side) relative to the heater 82. The read head unit 8 includes: a first read shield layer 3 made of a magnetic material and disposed on the insulating layer 83; an insulating layer 71 made of an insulating material, disposed on the insulating layer 83 and surrounding the first read shield layer 3; a first read shield gap film 4 which is an insulating film disposed over the first read shield layer 3 and the insulating layer 71; a magnetoresistive (MR) element 5 serving as a read element disposed on the first read shield gap film 4; and two leads (not shown) connected to the MR element 5. The magnetic head further includes: a second read shield gap film 6 which is an insulating film disposed over the MR element 5 and the leads; a second read shield layer 7 made of a magnetic material and disposed on the second read shield gap film 6; and an insulating layer 72 made of an insulating material, disposed on the second read shield gap film 6 and surrounding the second read shield layer 7.

An end of the MR element 5 is located in the medium facing surface 2. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of layers constituting the GMR element.

The magnetic head further includes: a write head unit 9 disposed forward along the direction T of travel of the recording medium relative to the read head unit 8; and an expansion layer 84, a sensor 85, and a nonmagnetic part 86 disposed between the read head unit 8 and the write head unit 9. The nonmagnetic part 86 is made of a nonmagnetic material. The material of the nonmagnetic part 86 may be alumina, for example.

The nonmagnetic part 86 includes nonmagnetic layers 87, 88, 89, and 90. The nonmagnetic layer 87 is disposed over the second read shield layer 7 and the insulating layer 72. The expansion layer 84 is disposed on the nonmagnetic layer 87. The nonmagnetic layer 88 is disposed on the nonmagnetic layer 87 and surrounds the expansion layer 84. The nonmagnetic layer 89 is disposed over the expansion layer 84 and the nonmagnetic layer 88. The sensor 85 is disposed on the nonmagnetic layer 89. The nonmagnetic layer 90 is disposed to cover the sensor 85.

The write head unit 9 includes a coil, a main pole 15, a write shield 16, and a gap part 17. The coil includes a first portion 20 and a second portion 10. The first portion 20 and the second portion 10 are both made of a conductive material such as copper. As shown in FIG. 3 and FIG. 4, the first portion 20 and the second portion 10 are both planar spiral-shaped. The first portion 20 and the second portion 10 are connected in series or in parallel. In FIG. 1 and FIG. 3, the reference symbol 10E indicates a coil connection part of the second portion 10 connected to the first portion 20. In FIG. 1 and FIG. 4, the reference symbol 20S indicates a coil connection part of the first portion 20 connected to the coil connection part 10E of the second portion 10.

The magnetic head further includes connection layers 25, 26, and 27 that are each made of a conductive material and are stacked in this order on the coil connection part 10E. The coil connection part 20S lies on the connection layer 27.

The coil including the first portion 20 and the second portion 10 produces a magnetic field corresponding to data to be written on the recording medium. The main pole 15 has an end face located in the medium facing surface 2. The main pole 15 allows a magnetic flux corresponding to the magnetic field produced by the coil to pass, and produces a write magnetic field for writing data on the recording medium by means of the perpendicular magnetic recording system. FIG. 1 shows a cross section that intersects the end face of the main pole 15 located in the medium facing surface 2 and that is perpendicular to the medium facing surface 2 and the top surface 1a of the substrate 1 (the cross section will hereinafter be referred to as main cross section).

The write shield 16 has an end face that is located in the medium facing surface 2 to wrap around the end face of the main pole 15. The write shield 16 is made of a magnetic material. Examples of materials that can be used for the write shield 16 include CoFeN, CoNiFe, NiFe, and CoFe.

The write shield 16 includes a first shield 16D, a second shield 16A, and two side shields 16B and 16C that are magnetically coupled to each other. The side shields 16B and 16C are disposed on opposite sides of the main pole 15 in the track width direction TW. The first shield 16D is located forward of the side shields 16B and 16C along the direction T of travel of the recording medium and is in contact with the side shields 16B and 16C. The second shield 16A is located backward of the side shields 16B and 16C along the direction T of travel of the recording medium and is in contact with the side shields 16B and 16C.

The first shield 16D has an end face 16Da that is located in the medium facing surface 2 at a position forward of the end face of the main pole 15 along the direction T of travel of the recording medium. The second shield 16A has an end face 16Aa that is located in the medium facing surface 2 at a position backward of the end face of the main pole 15 along the direction T of travel of the recording medium. The side shields 16B and 16C have two end faces 16Ba and 16Ca that are located in the medium facing surface 2 at positions on opposite sides of the end face of the main pole 15 in the track width direction TW.

The write head unit 9 further includes a first return path section 40 and a second return path section 30. The first return path section 40 and the second return path section 30 are both made of a magnetic material. Examples of materials that can be used for the first return path section 40 and the second return path section 30 include CoFeN, CoNiFe, NiFe, and CoFe. The first return path section 40 is disposed forward of the main pole 15 along the direction T of travel of the recording medium, and connects part of the main pole 15 away from the medium facing surface 2 to the first shield 16D. The second return path section 30 is disposed backward of the main pole 15 along the direction T of travel of the recording medium, and connects part of the main pole 15 away from the medium facing surface 2 to the second shield 16A.

The second return path section 30 includes a core part 31 and magnetic layers 32, 33, and 34. The magnetic layer 32 is disposed on the nonmagnetic layer 90. The core part 31 and the magnetic layer 33 are both disposed on the magnetic layer 32. The magnetic layer 33 is located near the medium facing surface 2. The core part 31 is located farther from the medium facing surface 2 than is the magnetic layer 33. The magnetic layers 32 and 33 have their respective end faces located in the medium facing surface 2. As shown in FIG. 3, the second portion 10 of the coil is wound one or more turns around the core part 31, which is a portion of the second return path section 30.

The magnetic head further includes: an insulating layer 51 made of an insulating material, disposed on the nonmagnetic layer 90 and surrounding the magnetic layer 32; an insulating film 52 made of an insulating material and interposed between the second portion 10 of the coil and each of the core part 31 and the magnetic layers 32 and 33; an insulating layer 53 made of an insulating material and disposed around the second portion 10 and in the space between every adjacent turns of the second portion 10; and an insulating layer 54 made of an insulating material and disposed around the magnetic layer 33 and the insulating layer 53. The top surfaces of the second portion 10, the core part 31, the magnetic layer 33, the insulating film 52 and the insulating layers 53 and 54 are even with each other. The insulating layers 51 and 54 and the insulating film 52 are made of alumina, for example. The insulating layer 53 is made of photoresist, for example.

The second shield 16A is disposed on the magnetic layer 33. The magnetic layer 34 is disposed on the core part 31. The connection layer 25 is disposed on the coil connection part 10E of the second portion 10. The magnetic head further includes an insulating layer 55 made of an insulating material. The insulating layer 55 is disposed over a portion of the top surface of the magnetic layer 33 and the top surfaces of second portion 10, the insulating film 52 and the insulating layers 53 and 54 and surrounds the second shield 16A, the magnetic layer 34 and the connection layer 25. The insulating layer 55 is made of alumina, for example.

As shown in FIG. 5, the main pole 15 has: a bottom end 15L which is an end closer to the top surface 1a of the substrate 1; a top surface 15T opposite to the bottom end 15L; and first and second side parts SP1 and SP2 that are opposite to each other in the track width direction TW. The side shield 16B has a first sidewall that faces the first side part SP1 of the main pole 15. The side shield 16C has a second sidewall that faces the second side part SP2 of the main pole 15.

The gap part 17 is made of a nonmagnetic material and disposed between the main pole 15 and the write shield 16. The gap part 17 includes a first portion 19 interposed between the main pole 15 and the first shield 16D, and a second portion 18 interposed between the main pole 15 and each of the second shield 16A and the side shields 16B and 16C.

The side shields 16B and 16C are disposed on the second shield 16A and in contact with the second shield 16A. The second portion 18 is arranged to extend along the sidewalls of the side shields 16B and 16C, the top surface of the second shield 16A, and the top surface of the insulating layer 55. The second portion 18 is made of a nonmagnetic material which may be an insulating material or a nonmagnetic metal material. Alumina is an example of insulating materials that can be used to form the second portion 18. Ru is an example of nonmagnetic metal materials that can be used to form the second portion 18. The second portion 18 has an opening for exposing the top surface of the magnetic layer 34 and an opening for exposing the top surface of the connection layer 25.

The main pole 15 is disposed over the second shield 16A and the insulating layer 55 such that the second portion 18 is interposed between the main pole 15 and the top surfaces of the second shield 16A and the insulating layer 55. As shown in FIG. 2, the second portion 18 is interposed also between the main pole 15 and each of the side shields 16B and 16C in the medium facing surface 2.

The bottom end 15L of the main pole 15 is in contact with the top surface of the magnetic layer 34 at a position away from the medium facing surface 2. The main pole 15 is made of a magnetic metal material. Examples of materials that can be used for the main pole 15 include NiFe, CoNiFe, and CoFe. The shape of the main pole 15 will be described in detail later.

The connection layer 26 is disposed on the connection layer 25. The magnetic head further includes an insulating layer 56 made of an insulating material and disposed around the main pole 15 and the connection layer 26. The insulating layer 56 is made of alumina, for example.

The magnetic head further includes: a nonmagnetic metal layer 58 made of a nonmagnetic metal material and disposed on part of the top surface 15T of the main pole 15 at a position away from the medium facing surface 2; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first portion 19 is disposed to cover the main pole 15, the nonmagnetic metal layer 58, and the insulating layer 59. The first portion 19 may be made of a nonmagnetic insulating material such as alumina, or a nonmagnetic conductive material such as Ru, NiCu, Ta, W, NiB, or NiP.

The first shield 16D is disposed over the side shields 16B and 16C and the first portion 19, and is in contact with the side shields 16B and 16C. In the medium facing surface 2, part of the end face of the first shield 16D is spaced from the end face of the main pole 15 by a predetermined distance created by the thickness of the first portion 19. The thickness of the first portion 19 preferably falls within the range of 5 to 60 nm, and may be 30 to 60 nm, for example. The end face of the main pole 15 has a side that is adjacent to the first portion 19, and the side defines the track width.

The first return path section 40 includes a yoke layer 41, a core part 42, and magnetic layers 43 and 44. The yoke layer 41 is disposed on the main pole 15 at a position away from the medium facing surface 2. The connection layer 27 is disposed on the connection layer 26. The magnetic head further includes a nonmagnetic layer 61 disposed around the first shield 16D, the yoke layer 41 and the connection layer 27. The nonmagnetic layer 61 is made of an inorganic insulating material, for example. The inorganic insulating material may be alumina or silicon oxide, for example. The top surfaces of the first shield 16D, the yoke layer 41, the connection layer 27, and the nonmagnetic layer 61 are even with each other.

The magnetic layer 43 is disposed over the first shield 16D and the nonmagnetic layer 61. The magnetic layer 43 has an end face located in the medium facing surface 2, and also has a top surface and a bottom surface. The bottom surface of the magnetic layer 43 has an end located in the medium facing surface 2. The top surface of the magnetic layer 43 includes an inclined portion and a flat portion. The inclined portion has an end located in the medium facing surface 2. The flat portion is contiguous with the inclined portion, and is located farther from the medium facing surface 2 than is the inclined portion. The distance from the top surface 1a of the substrate 1 to an arbitrary point on the inclined portion increases with decreasing distance from the arbitrary point to the medium facing surface 2. The flat portion is a plane that extends in a direction substantially perpendicular to the medium facing surface 2. The core part 42 is disposed on the yoke layer 41. As shown in FIG. 4, the first portion 20 of the coil is wound approximately two turns around the core part 42, which is a portion of the first return path section 40.

The magnetic head further includes: an insulating film 62 made of an insulating material and interposed between the first portion 20 of the coil and each of the yoke layer 41, the core part 42, the magnetic layer 43 and the nonmagnetic layer 61; an insulating layer 63 made of an insulating material and disposed around the first portion 20 and in the space between adjacent turns of the first portion 20; an insulating layer 64 made of an insulating material and disposed around the magnetic layer 43 and the insulating layer 63; and an insulating layer 65 disposed to cover the first portion 20. The coil connection part 20S of the first portion 20 lies on the connection layer 27. The top surfaces of the first portion 20, the core part 42, the insulating film 62 and the insulating layers 63 and 64, and the flat portion of the top surface of the magnetic layer 43 are even with each other. The insulating film 62 and the insulating layers 64 and 65 are made of alumina, for example. The insulating layer 63 is made of photoresist, for example.

The magnetic layer 44 lies over the core part 42, the magnetic layer 43 and the insulating layer 65, and connects the core part 42 and the magnetic layer 43 to each other. The magnetic layer 44 has an end face facing toward the medium facing surface 2 and located away from the medium facing surface 2. The magnetic head further includes an insulating layer 66 made of an insulating material and disposed to cover the inclined portion of the top surface of the magnetic layer 43 and to surround the magnetic layer 44. The top surfaces of the magnetic layer 44 and the insulating layer 66 are even with each other. The insulating layer 66 is made of alumina, for example.

The write head unit 9 further includes a stopper layer 91 disposed over the magnetic layer 44 and the insulating layer 66. The stopper layer 91 is made of a nonmagnetic material that has a high thermal conductivity, a low coefficient of linear thermal expansion, and a high hardness. It is preferred that the material of the stopper layer 91 have a higher thermal conductivity, a lower coefficient of linear thermal expansion, and a higher Vickers hardness than those of alumina. An example of such a material is SiC. Without the stopper layer 91, the magnetic layers 43 and 44 would expand with the heat generated by the first portion 20, thereby making part of the medium facing surface 2 protrude. The stopper layer 91 absorbs the heat generated by the first portion 20 and suppresses the expansion of the magnetic layers 43 and 44 toward the medium facing surface 2. This makes it possible to prevent part of the medium facing surface 2 from being protruded by the heat generated by the first portion 20.

The magnetic head further includes a protection layer 70 made of a nonmagnetic material and disposed to cover the write head unit 9. The protection layer 70 is made of, for example, an inorganic insulating material such as alumina.

As has been described, the magnetic head according to the embodiment includes the medium facing surface 2, the read head unit 8, and the write head unit 9. The medium facing surface 2 faces the recording medium. The read head unit 8 and the write head unit 9 are stacked on the substrate 1. Relative to the read head unit 8, the write head unit 9 is disposed forward along the direction T of travel of the recording medium (i.e., disposed on the trailing end side).

The write head unit 9 includes the coil including the first portion 20 and the second portion 10, the main pole 15, the write shield 16, the gap part 17, the first return path section 40, and the second return path section 30. The write shield 16 includes the first shield 16D, the second shield 16A, and the two side shields 16B and 16C. The gap part 17 includes the first portion 19 and the second portion 18.

The first return path section 40 includes the yoke layer 41, the core part 42, and the magnetic layers 43 and 44. As shown in FIG. 1, the first return path section 40 connects part of the main pole 15 away from the medium facing surface 2 to the first shield 16D so that a first space S1 is defined by the main pole 15, the gap part 17 (the first portion 19), the first shield 16D and the first return path section 40, thereby magnetically coupling the main pole 15 and the first shield 16D to each other. The first portion 20 of the coil passes through the first space S1.

The second return path section 30 includes the core part 31 and the magnetic layers 32 to 34. As shown in FIG. 1, the second return path section 30 connects part of the main pole 15 away from the medium facing surface 2 to the second shield 16A so that a second space S2 is defined by the main pole 15, the gap part 17 (the second portion 18), the second shield 16A and the second return path section 30, thereby magnetically coupling the main pole 15 and the second shield 16A to each other. The second portion 10 of the coil passes through the second space S2.

The first portion 20 and the second portion 10 of the coil will now be described in detail with reference to FIG. 3 and FIG. 4. FIG. 3 is a plan view showing the second portion 10 of the coil. The second portion 10 is wound one or more turns around the core part 31, which is a portion of the second return path section 30. The second portion 10 includes one or more coil elements extending through the second space S2. Note that the coil elements refer to part of the coil winding. In the embodiment, in particular, the second portion 10 is wound approximately two turns around the core part 31. The second portion 10 includes a first coil element 10A and a second coil element 10B each extending through the second space S2. The first coil element 10A is located between the second coil element 10B and the medium facing surface 2. No part of the coil other than the first and second coil elements 10A and 10B exists in the second space S2.

FIG. 4 is a plan view showing the first portion 20 of the coil. The first portion 20 is wound approximately two turns around the core part 42, which is a portion of the first return path section 40. The first portion 20 includes a first coil element 20A and a second coil element 20B each extending through the first space S1. The first coil element 20A is located between the second coil element 20B and the medium facing surface 2. No part of the coil other than the first and second coil elements 20A and 20B exists in the first space S1.

The coil connection part 20S of the first portion 20 is electrically connected to the coil connection part 10E of the second portion 10 via the connection layers 25 to 27. In the example shown in FIG. 3 and FIG. 4, the first portion 20 and the second portion 10 are connected in series.

The first and second coil elements 10A and 10B of the second portion 10 pass between the core part 31 and the magnetic layer 33, in particular, within the second space S2. As shown in FIG. 3, when the second portion 10 includes the two coil elements 10A and 10B, the minimum distance D between the core part 31 and the medium facing surface 2 falls within the range of 1.4 to 4.0 µm, for example. The minimum distance between the second coil element 10B and the core part 31 falls within the range of 50 to 200 nm, for example. As shown in FIG. 1 and FIG. 3, the second space S2 has an inner wall S2a. The inner wall S2a is mainly composed of the bottom end 15L of the main pole 15, the bottom surface of the second portion 18, an end face of the second shield 16A farther from the medium facing surface 2, an end face of the magnetic layer 33 farther from the medium facing surface 2, the top surface of the magnetic layer 32, an end face of the core part 31 facing toward the medium facing surface 2, and an end face of the magnetic layer 34 facing toward the medium facing surface 2. The first coil element 10A has an end face 10Aa facing toward the medium facing surface 2. The minimum distance between the end face 10Aa of the first coil element 10A and the inner wall S2a (the end face of the magnetic layer 33 farther from the medium facing surface 2) falls within the range of 50 to 200 nm, for example. The minimum distance between the second coil element 10B and the core part 31 and the minimum distance between the end face 10Aa of the first coil element 10A and the inner wall S2a correspond to the thickness of the insulating film 52.

In the embodiment, as shown in FIG. 3, the end face of the core part 31 facing toward the medium facing surface 2 has a convex shape, protruding toward the medium facing surface 2 so as to come closest to the medium facing surface 2 where it crosses the main cross section. Consequently, according to the embodiment, the distance between the core part 31 and the medium facing surface 2 in the main cross section is the minimum distance between the core part 31 and the medium facing surface 2.

The first and second coil elements 20A and 20B of the first portion 20 pass between the core part 42 and the magnetic layer 43, in particular, within the first space S1. The minimum distance between the core part 42 and the medium facing surface 2 falls within the range of 1.4 to 4.0 µm, for example. The minimum distance between the second coil element 20B and the core part 42 is preferably within the range of 50 to 200 nm, more preferably within the range of 80 to 120 nm, and most preferably 100 nm. As shown in FIG. 1 and FIG. 4, the first space S1 has an inner wall S1a. The inner wall S1a is mainly composed of the top surface 15T of the main pole 15, the top surface of the first portion 19, an end face of the first shield 16D farther from the medium facing surface 2, an end face of the magnetic layer 43 farther from the medium facing surface 2, the bottom surface of the magnetic layer 44, an end face of the core part 42 facing toward the medium facing surface 2, an end face of the yoke layer 41 facing toward the medium facing surface 2, and the top surface of the yoke layer 41. The first coil element 20A has an end face 20Aa facing toward the medium facing surface 2. The minimum distance between the end face 20Aa of the first coil element 20A and the inner wall S1a (the end face of the magnetic layer 43 farther from the medium facing surface 2) is preferably within the range of 50 to 200 nm, more preferably within the range of 80 to 120 nm, and most preferably 100 nm. The minimum distance between the second coil element 20B and the core part 42 and the minimum distance between the end face 20Aa of the first coil element 20A and the inner wall S1a correspond to the thickness of the insulating film 62.

In the embodiment, as shown in FIG. 4, the end face of the core part 42 facing toward the medium facing surface 2 has a convex shape, protruding toward the medium facing surface 2 so as to come closest to the medium facing surface 2 where it crosses the main cross section. Consequently, according to the embodiment, the distance between the core part 42 and the medium facing surface 2 in the main cross section is the minimum distance between the core part 42 and the medium facing surface 2.

The heater 82, the expansion layer 84, and the sensor 85 will be described in detail below. The expansion layer 84 and the sensor 85 are disposed between the read head unit 8 and the write head unit 9. Relative to the expansion layer 84 and the sensor 85, the heater 82 is located backward along the direction T of travel of the recording medium (i.e., located on the leading end side). The nonmagnetic part 86 is disposed around the expansion layer 84 and the sensor 85.

First, a description will be given of the heater 82 and the expansion layer 84. The heater 82 and the expansion layer 84 are provided for causing part of the medium facing surface 2 to protrude so as to reduce the distance from the read head unit 8 and the write head unit 9 to the surface of the recording medium. The heater 82 is energized to generate heat for causing part of the medium facing surface 2 to protrude. The expansion layer 84 expands with the heat generated by the heater 82 and thereby makes part of the medium facing surface 2 protrude.

The expansion layer 84 is made of a material that has a higher thermal conductivity and a higher coefficient of linear thermal expansion than those of the nonmagnetic part 86. The expansion layer 84 may be made of a metal material. The metal material to form the expansion layer 84 may be either a nonmagnetic metal material or a magnetic metal material. Examples of nonmagnetic metal materials that can be used to form the expansion layer 84 are Al, Cu, and Au. Examples of magnetic metal materials that can be used to form the expansion layer 84 are CoFeN, CoNiFe, NiFe, and CoFe.

The components of the magnetic head expand with the heat generated by the heater 82. In particular, the expansion layer 84 is made of a material that has a higher thermal conductivity than that of the surrounding nonmagnetic part 86. The heat generated by the heater 82 is therefore distributed within the expansion layer 84 more rapidly and uniformly than in the nonmagnetic part 86. Furthermore, the material of the expansion layer 84 has a higher coefficient of linear thermal expansion than that of the nonmagnetic part 86. With the heat generated by the heater 82, the expansion layer 84 therefore expands more rapidly and greatly than the nonmagnetic part 86 does, thereby making part of the medium facing surface 2 protrude. This reduces the distance from the read head unit 8 and the write head unit 9 to the surface of the recording medium.

Next, the sensor 85 will be described. The sensor 85 is intended to detect contact of part of the medium facing surface 2 with the recording medium. The sensor 85 is a resistor that varies in resistance with a change in its own temperature when part of the medium facing surface 2 makes contact with the recording medium. The sensor 85 is made of a metal material or a semiconductor material that varies in resistance at a considerable rate with respect to a change in temperature, i.e., that has a considerable temperature coefficient of resistance. Specific examples of the material of the sensor 85 include NiFe, W, Cu, Ni, and Pt.

When part of the medium facing surface 2 comes into contact with the recording medium, the frictional heat resulting from the contact raises the temperature of the medium facing surface 2 at and in the vicinity of the part in contact with the recording medium. Such a rise in temperature also raises the temperature of the sensor 85 itself. As a result, the sensor 85 varies in resistance. It is therefore possible to detect the contact of part of the medium facing surface 2 with the recording medium by measuring the resistance of the sensor 85 through not-shown two leads connected to the sensor 85.

The shape of the main pole 15 will now be described in detail with reference to FIG. 5. As shown in FIG. 5, the main pole 15 includes a track width defining portion 15A and a wide portion 15B. The track width defining portion 15A has an end face located in the medium facing surface 2, and an end opposite to the end face. The wide portion 15B is connected to the end of the track width defining portion 15A. As shown in FIG. 5, the main pole 15 has: the bottom end 15L which is the end closer to the top surface 1a of the substrate 1; the top surface 15T opposite to the bottom end 15L; the first side part SP1; and the second side part SP2. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 2. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 2, then becoming constant. Here, the length of the track width defining portion 15A in the direction perpendicular to the medium facing surface 2 will be referred to as neck height. The neck height falls within the range of 0 to 0.3 μm, for example. A zero neck height means that no track width defining portion 15A exists and an end face of the wide portion 15B is thus located in the medium facing surface 2.

The bottom end 15L includes a first portion 15L1, a second portion 15L2, and a third portion 15L3 that are contiguously arranged in order of increasing distance from the medium facing surface 2. The first portion 15L1 has an end located in the medium facing surface 2. Each of the first and second portions 15L1 and 15L2 may be an edge formed by two intersecting planes, or may be a plane connecting two planes to each other. The third portion 15L3 is a plane extending in a direction substantially perpendicular to the medium facing surface 2. The top surface 15T includes a fourth portion 15T1, a fifth portion 15T2, and a sixth portion 15T3 that are contiguously arranged in order of increasing distance from the medium facing surface 2. The fourth portion 15T1 has an end located in the medium facing surface 2.

The distance from the top surface 1a of the substrate 1 to any given point on each of the first and second portions 15L1 and 15L2 decreases with increasing distance from the given point to the medium facing surface 2. The angle of inclination of the second portion 15L2 with respect to the direction perpendicular to the medium facing surface 2 is greater than the angle of inclination of the first portion 15L1 with respect to the direction perpendicular to the medium facing surface 2. The second shield 16A has a top surface that is opposed to the first and second portions 15L1 and 15L2 with the gap part 17 (the second portion 18) interposed therebetween. The distance from the top surface 1a of the substrate 1 to any given point on the top surface of the second shield 16A decreases with increasing distance from the given point to the medium facing surface 2.

The distance from the top surface 1a of the substrate 1 to any given point on each of the fourth and fifth portions 15T1 and 15T2 increases with increasing distance from the given point to the medium facing surface 2. The angle of inclination of the fifth portion 15T2 with respect to the direction perpendicular to the medium facing surface 2 is greater than the angle of inclination of the fourth portion 15T1 with respect to the direction perpendicular to the medium facing surface 2. The sixth portion 15T3 extends in the direction substantially perpendicular to the medium facing surface 2. The first shield 16D has a bottom surface that is opposed to the fourth and fifth portions 15T1 and 15T2 with the gap part 17 (the first portion 19) interposed therebetween. The distance from the top surface 1a of the substrate 1 to any given point on the bottom surface of the first shield 16D increases with increasing distance from the given point to the medium facing surface 2.

Both the angle of inclination of the first portion 15L1 and the angle of inclination of the fourth portion 15T1 preferably fall within the range of 15° to 45°. Both the angle of inclination of the second portion 15L2 and the angle of inclination of the fifth portion 15T2 preferably fall within the range of 45° to 85°.

As shown in FIG. 5, the end face of the main pole 15 located in the medium facing surface 2 has a first side A1 adjacent to the first portion 19, a second side A2 connected to a first end of the first side A1, and a third side A3 connected to a second end of the first side A1. The first side A1 defines the track width. The position of an end of a record bit to be recorded on the recording medium depends on the position of the first side A1. The end face of the main pole 15 located in the medium facing surface 2 decreases in width in the track width direction TW with increasing proximity to the bottom end 15L of the main pole 15, that is, with increasing proximity to the top surface 1a of the substrate 1. Each of the second side A2 and the third side A3 is at an angle in the range of, for example, 7° to 17°, preferably 10° to 15°, with respect to the direction perpendicular to the top surface of the substrate 1. The first side A1 has a length in the range of 0.05 to 0.20 µm, for example.

The thickness (length in the direction perpendicular to the top surface 1a of the substrate 1) of the main pole 15 at the medium facing surface 2 falls within the range of 0.05 to 0.2 µm, for example. The distance between the third portion 15L3 and the sixth portion 15T3 falls within the range of 0.4 to 0.8 µm, for example.

FIG. 5 shows an example where the distance from the medium facing surface 2 to the boundary between the second portion 15L2 and the third portion 15L3, and the distance from the medium facing surface 2 to the boundary between the fifth portion 15T2 and the sixth portion 15T3, are both equal to the neck height, i.e., the distance from the medium facing surface 2 to the boundary between the track width defining portion 15A and the wide portion 15B. Nevertheless, the distance from the medium facing surface 2 to the boundary between the second portion 15L2 and the third portion 15L3, and the distance from the medium facing surface 2 to the boundary between the fifth portion 15T2 and the sixth portion 15T3, may each be smaller or greater than the neck height.

The function and effects of the magnetic head according to the embodiment will now be described. The magnetic head writes data on the recording medium by using the write head unit 9 and reads data written on the recording medium by using the read head unit 8. In the write head unit 9, the coil including the first portion 20 and the second portion 10 produces magnetic fields corresponding to data to be written on the recording medium. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. The first portion 20 and the second portion 10 are connected in series or in parallel so that the magnetic flux corresponding to the magnetic field produced by the first portion 20 and the magnetic flux corresponding to the magnetic field produced by the second portion 10 flow in the same direction through the main pole 15.

The main pole 15 allows the magnetic flux corresponding to the magnetic field produced by the first portion 20 and the magnetic flux corresponding to the magnetic field produced by the second portion 10 to pass, and produces a write magnetic field for writing data on the recording medium by means of the perpendicular magnetic recording system.

The write shield 16 captures a disturbance magnetic field applied to the magnetic head from the outside thereof. This makes it possible to prevent erroneous writing on the recording medium induced by the disturbance magnetic field intensively captured into the main pole 15. The write shield 16 also functions to capture a magnetic flux that is produced from the end face of the main pole 15 and spreads in directions other than the direction perpendicular to the plane of the recording medium, and to thereby prevent the magnetic flux from reaching the recording medium.

Furthermore, the write shield 16, the first return path section 40, and the second return path section 30 function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 40. Another part of the magnetic flux that has been produced from the end face of the main pole 15 and has magnetized the recording medium flows back to the main pole 15 through the write shield 16 and the second return path section 30.

The write shield 16 includes the first shield 16D, the second shield 16A, and the two side shields 16B and 16C. This embodiment thus makes it possible that, in regions both backward and forward of the end face of the main pole 15 along the direction T of travel of the recording medium and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, according to the embodiment, it is possible to prevent the skew-induced adjacent track erase. The first shield 16D and the second shield 16A contribute not only to the prevention of the skew-induced adjacent track erase but also to an increase in the gradient of the write magnetic field. The side shields 16B and 16C greatly contribute to the prevention of adjacent track erase, in particular. According to the embodiment, such functions of the write shield 16 serve to increase the recording density.

Furthermore, as shown in FIG. 5, this embodiment is configured so that in the medium facing surface 2, the distance between the first and second side parts SP1 and SP2 of the main pole 15 in the track width direction TW, i.e., the width of the end face of the main pole 15, decreases with increasing proximity to the top surface 1a of the substrate 1. According to the embodiment, this feature also serves to prevent the skew-induced adjacent track erase.

The embodiment is also configured so that in the medium facing surface 2, the distance between the first and second sidewalls of the side shields 16B and 16C in the track width direction TW decreases with increasing proximity to the top surface 1a of the substrate 1, as does the distance between the first and second side parts SP1 and SP2 of the main pole 15. The embodiment thus allows both the distance between the first side part SP1 and the first sidewall and the distance between the second side part SP2 and the second sidewall to be small and constant in the medium facing surface 2. This configuration makes it possible for the side shields 16B and 16C to efficiently capture the magnetic flux that is produced from the end face of the main pole 15 and spreads out to opposite areas in the track width direction TW. Consequently, according to the embodiment, it is possible to enhance the function of the side shields 16B and 16C in particular, and to thereby prevent the skew-induced adjacent track erase more effectively.

The write shield 16 cannot capture much magnetic flux if the write shield 16 is not magnetically connected with any magnetic layer having a sufficiently large volume enough to accommodate the magnetic flux captured by the write shield 16. In this embodiment, there are provided the first return path section 40 (the yoke layer 41, the core part 42 and the magnetic layers 43 and 44) which magnetically couples the first shield 16D of the write shield 16 and the main pole 15 to each other, and the second return path section 30 (the core part 31 and the magnetic layers 32 to 34) which magnetically couples the second shield 16A of the write shield 16 and the main pole 15 to each other. Such a configuration allows the magnetic flux captured by the write shield 16 to flow into the main pole 15 by way of the first return path section 40 and the second return path section 30. In this embodiment, the first return path section 40, the second return path section 30 and the main pole 15, which are magnetic layers large in volume, are magnetically connected to the write shield 16. This allows the write shield 16 to capture much magnetic flux, so that the above-described effect of the write shield 16 can be exerted effectively.

Furthermore, in this embodiment, the second shield 16A is provided in addition to the second return path section 30. In the main cross section, the magnetic layer 32, which is located farthest from the main pole 15 among the magnetic layers that constitute the second return path section 30, is greater than the second shield 16A in length in the direction perpendicular to the medium facing surface 2. The second portion 10 of the coil passes through the space S2. Such a structure is more advantageous than a structure where the magnetic layer 32 also serves as the second shield. More specifically, according to this embodiment, it is possible to bring the second shield 16A and the main pole 15 into sufficiently close proximity to each other. This enhances the function of the second shield 16A.

Now, a description will be made as to the role of the magnetic layer 33. First, suppose a case where the magnetic layer 33 is not provided and thus the second shield 16A and the magnetic layer 32 are not magnetically coupled to each other. In this case, the magnetic flux that has been captured by the second shield 16A or the side shields 16B and 16C and directed downward cannot flow toward the magnetic layer 32, and thus returns so as to proceed upward. This causes the second shield 16A or the side shields 16B and 16C to produce upwardly and downwardly directed magnetic fluxes. As a result, part of the magnetic flux captured by the second shield 16A or the side shields 16B and 16C leaks out of the medium facing surface 2. This may cause adjacent track erase. In contrast to this, if the second shield 16A and the magnetic layer 32 are magnetically coupled to each other by the magnetic layer 33, the magnetic flux captured by the side shields 16B and 16C is divided to flow upward and downward, and the magnetic flux captured by the second shield 16A is mainly directed downward. This can prevent the adjacent track erase that may be caused by part of the magnetic flux captured by the second shield 16A or the side shields 16B and 16C being leaked out of the medium facing surface 2.

The above description relating to the magnetic layer 33 also applies to the magnetic layer 43. More specifically, if the first shield 16D and the magnetic layer 44 are magnetically coupled to each other by the magnetic layer 43, the magnetic flux captured by the side shields 16B and 16C is divided into an upward flux and a downward flux, and the magnetic flux captured by the first shield 16D flows mainly upward. This can prevent the adjacent track erase that may be caused by part of the magnetic flux captured by the first shield 16D or the side shields 16B and 16C being leaked out of the medium facing surface 2.

If the second shield 16A is excessively long in the direction perpendicular to the medium facing surface 2 in the main cross section, flux leakage from the main pole 15 to the second shield 16A increases and the main pole 15 thus becomes unable to direct much magnetic flux to the medium facing surface 2. It is therefore necessary that the second shield 16A is not excessively long in the direction perpendicular to the medium facing surface 2 in the main cross section. In the main cross section, if the length of the magnetic layer 33 in the direction perpendicular to the medium facing surface 2 is equal to or smaller than that of the second shield 16A, the magnetic layer 33 cannot direct much magnetic flux from the second shield 16A to the magnetic layer 32. In this embodiment, in contrast, the magnetic layer 33 is configured so that in the main cross section, the length of the magnetic layer 33 in the direction perpendicular to the medium facing surface 2 is greater than that of the second shield 16A and smaller than that of the magnetic layer 32. Consequently, the embodiment allows the magnetic layer 33 to direct much magnetic flux from the second shield 16A to the magnetic layer 32.

Likewise, in this embodiment, the magnetic layer 43 is configured so that in the main cross section, the length of the magnetic layer 43 in the direction perpendicular to the medium facing surface 2 is greater than that of the first shield 16D and smaller than that of the magnetic layer 44. Consequently, the embodiment allows the magnetic layer 43 to direct much magnetic flux from the first shield 16D to the magnetic layer 44.

As the frequency of the recording signal is increased for higher recording density, the magnetic head needs improvement in the rate of change of the direction of the magnetic flux produced from the end face of the main pole 15. To meet such a requirement, it is effective to reduce the length of the magnetic path that passes through the write shield 16 and the main pole 15, i.e., the length of the magnetic path that passes through the first shield 16D, the first return path section 40, and the main pole 15 in particular. According to the embodiment, it is possible to reduce the length of the aforementioned magnetic path while securing a sufficient magnetomotive force of the coil, for the reason described below.

The first portion 20 of the coil is wound around the core part 42, which is a portion of the first return path section 40. In order to secure a sufficient magnetomotive force of the coil or the first portion 20 in particular, the first portion 20 needs to be wound at least approximately two turns. In other words, two or more coil elements need to pass through the first space S1. On the other hand, the minimum distance between the core part 42 and the medium facing surface 2 is preferably smaller in order to reduce the length of the magnetic path passing through the first shield 16D, the first return path section 40 and the main pole 15. If there are three or more coil elements passing through the first space S1 and those coil elements are arranged in the direction perpendicular to the medium facing surface 2, it is difficult to reduce the minimum distance D between the core part 42 and the medium facing surface 2.

In the embodiment, the first portion 20 includes the first coil element 20A and the second coil element 20B each extending through the first space S1. No part of the coil other than the first and second coil elements 20A and 20B exists in the first space S1. In other words, there are only a minimum necessary number of coil elements in the first space S1. According to the embodiment, it is therefore possible to reduce the minimum distance D between the core part 42 and the medium facing surface 2 while securing a sufficient magnetomotive force of the coil. The embodiment allows the minimum distance D between the core part 42 and the medium facing surface 2 to be 4.0 µm or less.

In the embodiment, the distance "D" between the core part 42 and the medium facing surface 2 in the main cross section is the minimum distance D between the core part 42 and the medium facing surface 2. In order to secure a sufficient magnetomotive force of the coil, it is preferred that both the first and second coil elements 20A and 20B, when seen in the main cross section, have a length of 0.3 µm or greater in the direction perpendicular to the medium facing surface 2. It is most preferred that both the distance between the first coil element 20A and the magnetic layer 43 and the distance between the second coil element 20B and the core part 42 in the main cross section be 0.1 µm (100 nm). It is also preferred that the distance between the first coil element 20A and the second coil element 20B be 0.1 µm or greater. It is also preferred that the flat portion of the top surface of the magnetic layer 43, when seen in the main cross section, be 0.4 µm or greater in length in the direction perpendicular to the medium facing surface 2. It is also preferred that, when seen in the main cross section, there be a distance of 0.1 µm or greater between the medium facing surface 2 and the end of the flat portion of the top surface of the magnetic layer 43 closer to the medium facing surface 2. Consequently, it is preferred that the distance between the core part 42 and the medium facing surface 2 in the main cross section, i.e., the minimum distance D between the core part 42 and the medium facing surface 2, be 1.4 µm or greater.

From the foregoing, according to the embodiment, it is possible to reduce the length of the magnetic path passing through the first shield 16D and the main pole 15, i.e., the length of the magnetic path passing through the first shield 16D, the first return path section 40, and the main pole 15, wherein the first shield 16D has the end face 16Da located in the medium facing surface 2 at a position forward of the end face of the main pole 15 along the direction T of travel of the recording medium. The embodiment also makes it possible to secure a sufficient magnetomotive force of the coil. Consequently, according to the embodiment, it is possible to improve the rate of change of the direction of the magnetic flux produced from the end face of the main pole 15.

In the embodiment, the coil includes the first portion 20 and the second portion 10. The first portion 20 is wound around the core part 42, which is a portion of the first return path section 40, while the second portion 10 is wound around the core part 31, which is a portion of the second return path section 30. For the purpose of comparison, suppose a comparative example having a coil helically wound around the main pole 15. When compared with such a comparative example under the condition that the same number of coil elements pass through the first space S1, the embodiment is larger in the number of turns of the coil. The embodiment therefore achieves a greater magnetomotive force of the coil as compared with the comparative example. It is thus possible to secure a desired magnetomotive force while reducing the number of coil elements passing through the first space S1 to reduce the length of the magnetic path passing through the first shield 16D, the first return path part 40, and the main pole 15. The embodiment also allows the structure of the coil and the structure in the vicinity of the coil to be more simplified as compared with the comparative example.

The other effects provided by the embodiment will now be described. In this embodiment, the bottom end 15L of the main pole 15 includes the first portion 15L1, the second portion 15L2, and the third portion 15L3 that are contiguously arranged in order of increasing distance from the medium facing surface 2. The top surface 15T of the main pole 15 includes the fourth portion 15T1, the fifth portion 15T2, and the sixth portion 15T3 that are contiguously arranged in order of increasing distance from the medium facing surface 2. The distance from the top surface 1a of the substrate 1 to any given point on each of the first and second portions 15L1 and 15L2 decreases with increasing distance from the given point to the medium facing surface 2. The distance from the top surface 1a of the substrate 1 to any given point on each of the fourth and fifth portions 15T1 and 15T2 increases with increasing distance from the given point to the medium facing surface 2. Consequently, the embodiment allows the main pole 15 to have a small thickness in the medium facing surface 2. This makes it possible to prevent the skew-induced adjacent track erase. The embodiment further allows the main pole 15 to have a great thickness in the part away from the medium facing surface 2. This allows the main pole 15 to direct much magnetic flux to the medium facing surface 2, and consequently allows the improvement of write characteristics such as overwrite property.

In the main pole 15 of this embodiment, the angles of inclination of the first and fourth portions 15L1 and 15T1 can be reduced to thereby suppress variations in write characteristics associated with changes in level of the medium facing surface 2. Furthermore, in the main pole 15, the angles of inclination of the second and fifth portions 15L2 and 15T2 can be increased to thereby provide a great distance between the third portion 15L3 and the sixth portion 15T3 while achieving a small thickness of the main pole 15 in the medium facing surface 2. This allows preventing the skew-induced problems and improving write characteristics. Consequently, according to the embodiment, it is possible to prevent the skew-induced problems and to improve write characteristics while suppressing variations in write characteristics associated with changes in level of the medium facing surface 2.

A method of manufacturing the magnetic head according to the embodiment will now be described. In the method of manufacturing the magnetic head according to the embodiment, first, as shown in FIG. 1 and FIG. 2, the insulating layer 81, the heater 82, the insulating layer 83, the first read shield layer 3, the insulating layer 71, and the first read shield gap film 4 are formed in this order on the substrate 1. Next, the MR element 5 and not-shown two leads connected to the MR element 5 are formed on the first read shield gap film 4. The second read shield gap film 6 is then formed to cover the MR element 5 and the leads. Next, the second read shield layer 7 and the insulating layer 72 are formed on the second read shield gap film 6. The nonmagnetic layer 87, the expansion layer 84, the nonmagnetic layers 88 and 89, the sensor 85, and the nonmagnetic layer 90 are then formed in this order over the second read shield layer 7 and the insulating layer 72.

Next, the magnetic layer 32 is formed on the nonmagnetic layer 90 by frame plating, for example. Next, the insulating layer 51 is formed over the entire top surface of the stack. The insulating layer 51 is then polished by, for example, chemical mechanical polishing (hereinafter referred to as CMP), until the magnetic layer 32 is exposed. The top surfaces of the magnetic layer 32 and the insulating layer 51 are thereby made even with each other.

Next, the core part 31 and the magnetic layer 33 are formed on the magnetic layer 32 by frame plating, for example. The core part 31 and the magnetic layers 32 and 33 form an accommodation part for accommodating the first and second coil elements 10A and 10B of the second portion 10 of the coil. The accommodation part has an inner wall. The inner wall is mainly composed of a wall face of the magnetic layer 33 farther from the position where the medium facing surface 2 is to be formed, the top surface of the magnetic layer 32, and a wall face of the core part 31 facing toward the position where the medium facing surface 2 is to be formed.

Next, the insulating film 52 is formed to cover the aforementioned inner wall of the accommodation part. The insulating film 52 is formed also over the top surface of the magnetic layer 33, the top surface of the core part 31, another wall face of the core part 31, and the top surface of the insulating layer 51. The insulating film 52 has a thickness in the range of 50 to 200 nm, for example.

Next, a conductive layer that is to become the second portion 10 later is formed such that the conductive layer is in contact with the inner wall of the accommodation part via the insulating film 52 and protrudes from the accommodation part. The conductive layer is formed by, for example, frame plating, in such a manner as to have the same planar spiral shape as that of the second portion 10. The portion of the conductive layer protruding from the accommodation part is located at a level higher than the core part 31 and the magnetic layer 33.

Next, the insulating layer 53 is formed in the space between every adjacent turns of the conductive layer. The insulating layer 54 is then formed over the entire top surface of the stack. Next, the conductive layer is polished so that the portion of the conductive layer protruding from the accommodation part is removed and the conductive layer thereby becomes the second portion 10. More specifically, the conductive layer, the core part 31, the magnetic layer 33, the insulating film 52, and the insulating layers 53 and 54 are polished by, for example, CMP, so that their top surfaces become even with each other. This makes the conductive layer into the second portion 10. The method for forming the second portion 10 is the same as the method for forming the first portion 20 to be described in detail later.

Next, the second shield 16A is formed on the magnetic layer 33, the magnetic layer 34 is formed on the core part 31, and the connection layer 25 is formed on the coil connection part 10E of the second portion 10 by, for example, frame plating. Next, the insulating layer 55 is formed over the top surface of the stack. The insulating layer 55 is then polished by, for example, CMP, until the top surfaces of the second shield 16A, the magnetic layer 34 and the connection layer 25 are exposed. The top surfaces of the second shield 16A, the magnetic layer 34, the connection layer 25 and the insulating layer 55 are thereby made even with each other. Next, the two side shields 16B and 16C are formed on the second shield 16A by frame plating, for example.

Next, a not-shown etching mask is formed over the second shield 16A and the side shields 16B and 16C. The etching mask is formed by patterning a photoresist layer. The magnetic layer 34, the connection layer 25, and the insulating layer 55 are then etched by using the etching mask. The etching proceeds until the etched bottom reaches a level between the top and bottom surfaces of the insulating layer 55 when unetched. For example, reactive ion etching is employed for this etching. Next, the etching mask is removed. The top surface of the second shield 16A is then etched by, for example, ion beam etching, in the portion thereof in the vicinity of the position where the medium facing surface 2 is to be formed. This etching determines the shape of the top surface of the second shield 16A.

Next, the second portion 18 of the gap part 17 is formed to cover the second shield 16A and the side shields 16B and 16C. An opening for exposing the top surface of the magnetic layer 34 and an opening for exposing the top surface of the connection layer 25 are then formed in the second portion 18. Next, a preliminary main pole to become the main pole 15 later is formed on the second portion 18, and the connection layer 26 is formed on the connection layer 25 by, for example, frame plating. The preliminary main pole and the connection layer 26 are formed such that their top surfaces are located at a level higher than the top surfaces of portions of the second portion 18 lying on the side shields 16B and 16C. Next, the insulating layer 56 is formed over the entire top surface of the stack. The preliminary main pole, the connection layer 26 and the insulating layer 56 are then polished by, for example, CMP, until the top surfaces of the side shields 16B and 16C are exposed. The top surfaces of the preliminary main pole, the side shields 16B and 16C, the connection layer 26 and the insulating layer 56 are thereby made even with each other.

Next, a first mask layer and a second mask layer, which are to later become the nonmagnetic metal layer 58 and the insulating layer 59, respectively, are formed over the preliminary main pole and the side shields 16B and 16C. Using the first and second mask layers as an etching mask, the preliminary main pole and the side shields 16B and 16C are then partially etched by ion beam etching, for example. As a result, the first mask layer, the second mask layer, and the preliminary main pole become the nonmagnetic metal layer 58, the insulating layer 59, and the main pole 15, respectively. This etching determines the shape of the top surface 15T of the main pole 15.

Next, the first portion 19 of the gap part 17 is formed over the entire top surface of the stack by sputtering or chemical vapor deposition, for example. The first portion 19, the nonmagnetic metal layer 58 and the insulating layer 59 are then selectively etched by, for example, ion beam etching, so that a portion of the top surface 15T of the main pole 15 and portions of the top surfaces of the side shields 16B and 16C are exposed. Next, the first shield 16D is formed over the side shields 16B and 16C and the first portion 19, the yoke layer 41 is formed on the main pole 15, and the connection layer 27 is formed on the connection layer 26 by, for example, frame plating.

Next, the nonmagnetic layer 61 is formed over the entire top surface of the stack. The nonmagnetic layer 61 is then polished by, for example, CMP, until the first shield 16D, the yoke layer 41, and the connection layer 27 are exposed. The top surfaces of the first shield 16D, the yoke layer 41, the connection layer 27 and the nonmagnetic layer 61 are thereby made even with each other.

Reference is now made to FIG. 6 to FIG. 10 to describe a series of steps, subsequent to the aforementioned step, down to the step of forming the first portion 20 of the coil. FIG. 6 to FIG. 10 each show a stack of layers formed in the process of manufacturing the magnetic head. FIG. 6 to FIG. 10 each show a cross section of the stack perpendicular to the medium facing surface 2 and the top surface 1a of the substrate 1. The parts that are closer to the substrate 1 than are the first shield 16D, the yoke layer 41 and the nonmagnetic layer 61 are not shown in FIG. 6 to FIG. 10.

Figure 6:
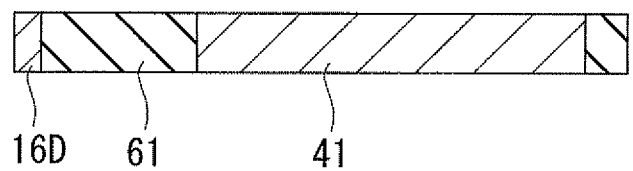
FIG. 6 is a cross-sectional view showing a step of a method of manufacturing the magnetic head according to the embodiment of the invention.

FIG. 6 shows the stack after the top surfaces of the first shield 16D, the yoke layer 41, the connection layer 27, and the nonmagnetic layer 61 have been made even with each other.

Figure 7:
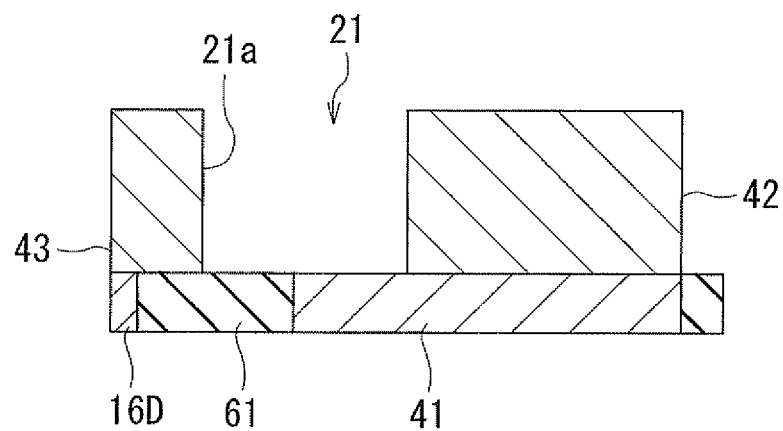
FIG. 7 is a cross-sectional view showing a step that follows the step shown in FIG. 6.

FIG. 7 shows the next step. In this step, first, the core part 42 is formed on the yoke layer 41 and the magnetic layer 43 is formed over the first shield 16D and the nonmagnetic layer 61 by, for example, frame plating. The yoke layer 41, the core part 42, the magnetic layer 43 and the nonmagnetic layer 61 form an accommodation part 21 for accommodating the first and second coil elements 20A and 20B of the first portion 20 of the coil. The accommodation part 21 has an inner wall 21a. The inner wall 21a is composed of a wall face of the magnetic layer 43 farther from the position where the medium facing surface 2 is to be formed, a portion of the top surface of the nonmagnetic layer 61, a portion of the top surface of the yoke layer 41, and a wall face of the core part 42 facing toward the position where the medium facing surface 2 is to be formed.

The process from the step of forming the yoke layer 41 to the step of forming the core part 42 and the magnetic layer 43 shown in FIG. 7 corresponds to "the step of forming an accommodation part for accommodating the first and second coil elements, by using a portion of the first return path section including the core part" according to the invention.

Figure 8:
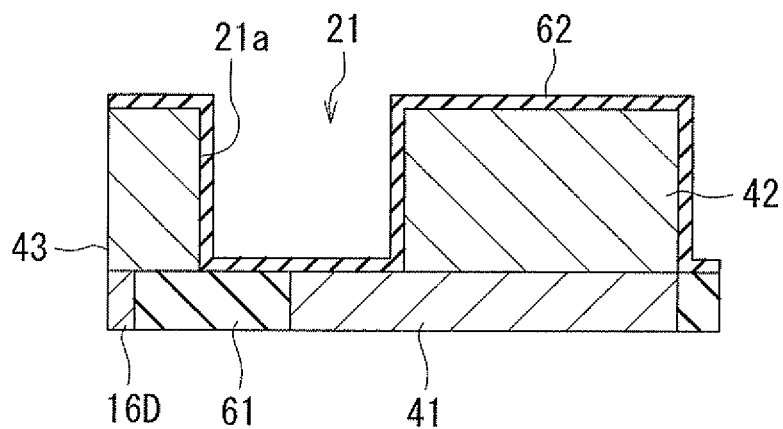
FIG. 8 is a cross-sectional view showing a step that follows the step shown in FIG. 7.

FIG. 8 shows the next step. In this step, first, the insulating film 62 is formed to cover the inner wall 21a of the accommodation part 21. The insulating film 62 is formed also over the top surface of the magnetic layer 43, another wall face of the core part 42, and another portion of the top surface of the nonmagnetic layer 61. The thickness of the insulating film 62 is preferably within the range of 50 to 200 nm, more preferably within the range of 80 to 120 nm, and most preferably 100 nm. Next, an opening for exposing the top surface of the connection layer 27 is formed in the insulating film 62.

Figure 9:
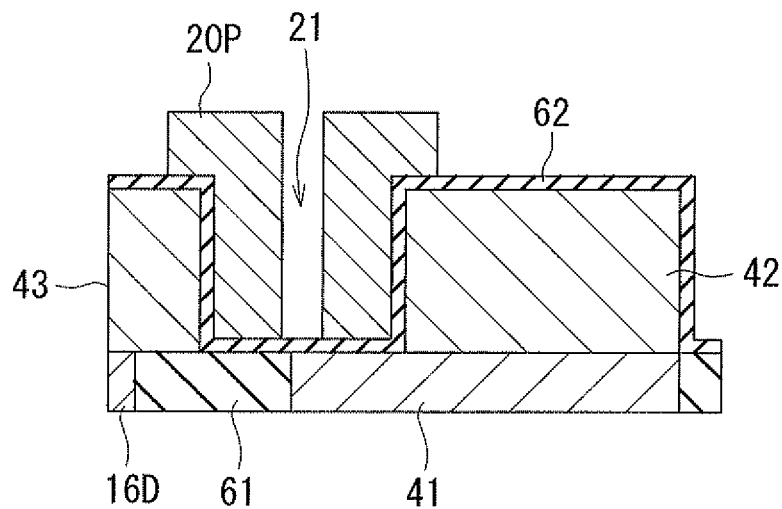
FIG. 9 is a cross-sectional view showing a step that follows the step shown in FIG. 8.

FIG. 9 shows the next step. In this step, a conductive layer 20P that is to become the first portion 20 later is formed such that the conductive layer 20P is in contact with the inner wall 21a of the accommodation part 21 via the insulating film 62 and protrudes from the accommodation part 21. The conductive layer 20P is formed by, for example, frame plating, in such a manner as to have the same planar spiral shape as that of the first portion 20. The portion of the conductive layer 20P protruding from the accommodation part 21 is located at a level higher than the core part 42 and the magnetic layer 43.

Figure 10:
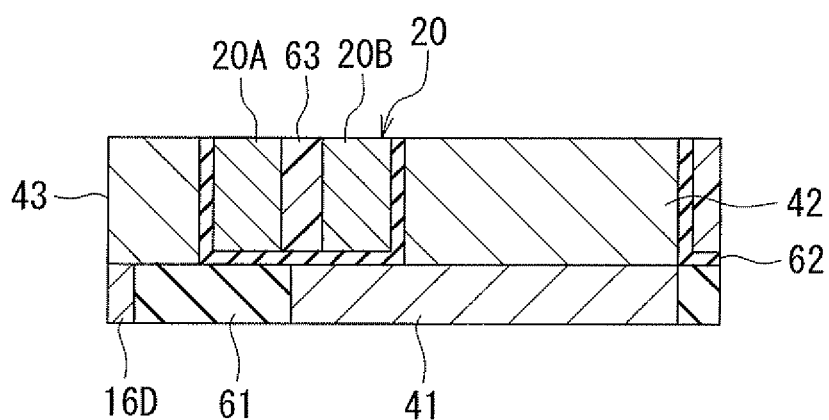
FIG. 10 is a cross-sectional view showing a step that follows the step shown in FIG. 9.

FIG. 10 shows the next step. In this step, first, the insulating layer 63 is formed in the space between every adjacent turns of the conductive layer 20P. The conductive layer 20P is then polished so that the portion of the conductive layer 20P protruding from the accommodation part 21 is removed and the conductive layer 20P thereby becomes the first portion 20. More specifically, the conductive layer 20P, the core part 42, the magnetic layer 43, the insulating film 62, and the insulating layers 63 and 64 are polished by, for example, CMP, so that their top surfaces become even with each other.

Steps that follow the step of FIG. 10 will now be described with reference to FIG. 1 and FIG. 2. First, the insulating layer 65 is formed to cover the first portion 20. Next, the magnetic layer 44 is formed over the top surface of the core part 42 and portions of the top surfaces of the magnetic layer 43 and the insulating layer 65 by frame plating, for example. Another portion of the top surface of the magnetic layer 43 is then etched to form the inclined portion mentioned previously. For example, ion beam etching is employed for this etching. Next, the insulating layer 66 is formed over the entire top surface of the stack. The insulating layer 66 is then polished by, for example, CMP, until the magnetic layer 44 is exposed. The top surfaces of the magnetic layer 44 and the insulating layer 66 are thereby made even with each other. Next, the stopper layer 91 is formed over the magnetic layer 44 and the insulating layer 66.

Next, the protection layer 70 is formed to cover the entire top surface of the stack. Wiring, terminals and other components are then formed on the protection layer 70, and the substrate 1 is cut near the position where the medium facing surface 2 is to be formed. The cut surface is polished to form the medium facing surface 2, and then fabrication of flying rails and other processes are performed to complete the magnetic head.

In the method of manufacturing the magnetic head according to the embodiment, the accommodation part 21 for accommodating the first and second coil elements 20A and 20B of the first portion 20 is formed by using a portion of the first return path section 40 including the core part 42. The insulating film 62 is then formed to cover the inner wall 21a of the accommodation part 21 in the step shown in FIG. 8. Then, in the step shown in FIG. 9, the conductive layer 20P to become the first portion 20 later is formed such that the conductive layer 20P is in contact with the inner wall 21a of the accommodation part 21 via the insulating film 62 and protrudes from the accommodation part 21. In the step shown in FIG. 10, the conductive layer 20P is polished so that the portion of the conductive layer 20P protruding from the accommodation part 21 is removed and the conductive layer 20P thereby becomes the first portion 20.

According to such a method of manufacturing the magnetic head, it is possible to easily form the first portion 20 of the coil such that the first coil element 20A is in contact with the magnetic layer 43 via the insulating film 62 and the second coil element 20B is in contact with the core part 42 via the insulating film 62. This makes it possible to easily reduce the minimum distance between the end face 20Aa of the first coil element 20A and the end face of the magnetic layer 43 farther from the medium facing surface 2 and the minimum distance between the second coil element 20B and the core part 42. Consequently, it is possible to easily reduce the length of the magnetic path passing through the first shield 16D, the first return path section 40, and the main pole 15.

The embodiment allows the structure of the coil and the structure in the vicinity of the coil to be more simplified to reduce the number of steps for forming the coil, as compared with a comparative example having a coil helically wound around the main pole 15.

The present invention is not limited to the foregoing embodiment, and various modifications may be made thereto. For example, the number of turns of the second portion 10 of the coil is not limited to approximately two, and may be one, three, or more.

The foregoing embodiment has been described with reference to a magnetic head having such a structure that the read head unit 8 is formed on the base body and the write head unit 9 is stacked on the read head unit 8; however, the read head unit 8 the write head unit 9 may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording, comprising:

a medium facing surface that faces a recording medium;
a coil that produces a magnetic field corresponding to data to be written on the recording medium;
a main pole that has an end face located in the medium facing surface, the main pole allowing a magnetic flux corresponding to the magnetic field produced by the coil to pass, and producing a write magnetic field for writing the data on the recording medium by means of a perpendicular magnetic recording system;
a first shield made of a magnetic material and having an end face that is located in the medium facing surface at a position forward of the end face of the main pole along a direction of travel of the recording medium;
a gap part made of a nonmagnetic material and including a first portion interposed between the main pole and the first shield; and
a first return path section made of a magnetic material and disposed forward of the main pole along the direction of travel of the recording medium, wherein:
the first return path section connects part of the main pole away from the medium facing surface to the first shield so that a first space is defined by the main pole, the gap part, the first shield, and the first return path section;
the first return path section includes a core part;
the coil includes a first portion having a planar spiral shape and wound around the core part, the first portion including a first coil element and a second coil element that each extend through the first space;
the first coil element is located between the second coil element and the medium facing surface;
no part of the coil other than the first and second coil elements exists in the first space; and
a minimum distance between the core part and the medium facing surface falls within a range of 1.4 to 4.0 µm.

2. The magnetic head for perpendicular magnetic recording according to claim 1, wherein a minimum distance between the second coil element and the core part falls within a range of 50 to 200 nm.

3. The magnetic head for perpendicular magnetic recording according to claim 1, wherein:
the first space has an inner wall;
the first coil element has an end face facing toward the medium facing surface; and
a minimum distance between the end face of the first coil element and the inner wall falls within a range of 50 to 200 nm.

4. The magnetic head for perpendicular magnetic recording according to claim 1, further comprising:
a second shield made of a magnetic material and having an end face that is located in the medium facing surface at a position backward of the end face of the main pole along the direction of travel of the recording medium; and
a second return path section made of a magnetic material and disposed backward of the main pole along the direction of travel of the recording medium, wherein:
the gap part further includes a second portion interposed between the main pole and the second shield;
the second return path section connects part of the main pole away from the medium facing surface to the second shield so that a second space is defined by the main pole, the gap part, the second shield, and the second return path section; and
the coil includes a second portion having a planar spiral shape and wound around a portion of the second return path section.

5. The magnetic head for perpendicular magnetic recording according to claim 1, further comprising two side shields that are each made of a magnetic material and that have two end faces located in the medium facing surface at positions on opposite sides of the end face of the main pole in a track width direction.

6. A method of manufacturing the magnetic head for perpendicular magnetic recording of claim 1, comprising the steps of:
forming the main pole;
forming the gap part;
forming the first shield;
forming the first return path section; and
forming the coil, wherein:
the step of forming the first return path section includes the step of forming an accommodation part for accommodating the first and second coil elements, by using a portion of the first return path section including the core part; and
the accommodation part has an inner wall,
the method of manufacturing the magnetic head further comprising the step of forming an insulating film to cover the inner wall of the accommodation part,
wherein the step of forming the coil includes the steps of:
forming a conductive layer that is to become the first portion later, such that the conductive layer is in contact with the inner wall of the accommodation part via the insulating film and protrudes from the accommodation part; and
polishing the conductive layer so that a portion of the conductive layer protruding from the accommodation part is removed and the conductive layer thereby becomes the first portion.

7. The method of manufacturing the magnetic head for perpendicular magnetic recording according to claim 6, wherein the insulating film has a thickness within a range of 50 to 200 nm.

* * * * *